(12) United States Patent
Dai et al.

(10) Patent No.: US 11,846,379 B2
(45) Date of Patent: Dec. 19, 2023

(54) VARIABLE-FLOW-PATH AIR VALVE FOR WATER HAMMER PREVENTION AND A DESIGN METHOD

(71) Applicants: CHINA THREE GORGES CORPORATION, Beijing (CN); CHINA INSTITUTE OF WATER RESOURCES AND HYDROPOWER RESEARCH, Beijing (CN)

(72) Inventors: Huichao Dai, Beijing (CN); Hao Wang, Beijing (CN); Jiazhen Li, Beijing (CN); Xinlei Guo, Beijing (CN); Yongxin Guo, Beijing (CN); Tao Wang, Beijing (CN); Hanqing Zhao, Beijing (CN); Hui Fu, Beijing (CN); Jiajia Pan, Beijing (CN)

(73) Assignees: CHINA THREE GORGES CORPORATION, Beijing (CN); CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 17/779,073

(22) PCT Filed: Apr. 13, 2021

(86) PCT No.: PCT/CN2021/087072
§ 371 (c)(1),
(2) Date: May 23, 2022

(87) PCT Pub. No.: WO2022/016917
PCT Pub. Date: Jan. 27, 2022

(65) Prior Publication Data
US 2023/0160515 A1    May 25, 2023

(30) Foreign Application Priority Data

Aug. 11, 2020 (CN) .......................... 202010800057.5

(51) Int. Cl.
*F16K 24/04* (2006.01)
*F16L 55/055* (2006.01)
*F16K 15/03* (2006.01)

(52) U.S. Cl.
CPC .......... *F16L 55/055* (2013.01); *F16K 15/034* (2021.08); *F16K 24/046* (2013.01)

(58) Field of Classification Search
CPC ......... F16L 55/055; E03F 5/08; E03C 1/1225; F16K 15/034; F16K 15/035; F16K 17/12;
(Continued)

(56) References Cited

U.S. PATENT DOCUMENTS 8,312,889 B2   11/2012 Oltman et al.
2002/0189675 A1*  12/2002 Huber ....................... E03F 5/08
137/362

(Continued)

FOREIGN PATENT DOCUMENTS

CN   102401155 A   4/2012
CN   102644778 A   8/2012
(Continued)

OTHER PUBLICATIONS

International Search Report of PCT/CN2021/087072.
Written Opinion of PCT/CN2021/087072.

*Primary Examiner* — Hailey K. Do
(74) *Attorney, Agent, or Firm* — Dragon Sun Law Firm, PC; Nathaniel Perkins

(57) ABSTRACT

The present invention relates to a variable-flow-path air valve for water hammer prevention and a design method. The variable-flow-path air valve includes a valve body with a top provided with an air intake-exhaust port. A ball valve seat and a floating ball are arranged below the air intake-exhaust port. The valve body is provided with at least one swing check valve configured to be opened inward. The swing check valve includes: a swing valve disc connected to
(Continued)

a valve body hinge, a variable-flow-path air inlet controlled by the swing valve disc to open and close, a device for limiting the opening degree of the swing valve disc, and a sealing device. In the present invention, the air valve takes in air through the air intake-exhaust port and the variable flow path, and discharges air only through the air intake-exhaust port.

11 Claims, 7 Drawing Sheets

(58) Field of Classification Search
CPC .... F16K 24/042; F16K 24/044; F16K 24/046; F16K 47/023; F16K 31/22
See application file for complete search history.

(56) References Cited

U.S. PATENT DOCUMENTS

2003/0205272 A1* 11/2003 Benjey ............... F16K 24/042
137/202
2014/0116540 A1 5/2014 Waldor

FOREIGN PATENT DOCUMENTS

| CN | 104896184 A | 9/2015 | | |
|---|---|---|---|---|
| CN | 207145661 U | 3/2018 | | |
| CN | 110701369 A | 1/2020 | | |
| CN | 111853290 A | 10/2020 | | |
| GB | 191111529 A | * | 4/1912 | ............ E03F 5/08 |
| WO | WO-2011058551 A1 | * | 5/2011 | ............ E03B 7/075 |

* cited by examiner

VARIABLE-FLOW-PATH AIR VALVE FOR WATER HAMMER PREVENTION AND A DESIGN METHOD

CROSS-REFERENCE TO RELATED APPLICATIONS

This Application is a national stage application of PCT/CN2021/087072. This application claims priorities from PCT Application No. PCT/CN2021/087072, filed Apr. 13, 2021, and from the Chinese patent application 202010800057.5 filed Aug. 11, 2020, the content of which are incorporated herein in the entirety by reference.

TECHNICAL FIELD

The present disclosure relates to a variable-flow-path air valve for water hammer prevention and a design method, and particularly to an apparatus for water hammer prevention in a pipeline system, a method of using the apparatus, and a method for designing the apparatus. More specifically, the present disclosure relates to an apparatus and method for protecting pressure water pipelines in the hydraulic transient process of long-distance water diversion or urban water supply and drainage.

BACKGROUND

The uneven temporal and spatial distribution or shortage of resources is a major bottleneck in China's current status of water resources and the economic and social development of some regions. The long-distance water diversion project is the most common engineering measure to optimize the allocation of water resources. Water diversion projects typically use open channels, pipelines, tunnels, box culverts, and the like for water delivery and distribution. Among them, water delivery by pipelines is more widely used, as it is less susceptible to external interference, occupies less land, and can adapt to complex terrains, landforms and climate conditions.

During water delivery by pipelines, due to changes in boundary conditions, switching of operating conditions and occurrence of accidents or emergency conditions, a change in the water flow velocity causes a surge in the system pressure, making a sound resembling a hammering noise in the pipeline, which is called water hammer or hydraulic shock. Without engineering protective measures, water hammer in pipelines can generate transient high pressures of several-hundred-meters head, thereby inducing pipeline bursts; or cause vacuum vaporization, thereby collapsing or rupturing the pipelines due to the transient high pressure generated by water column bridging.

The air valve is one of the common pipeline protection devices, functioning to: (1) discharge the air in the pipeline when the system is filled with water for the first time or restarted after being out of service for maintenance; (2) open when a negative water hammer pressure occurs, so that the air can quickly enter the pipeline to avoid collapsing the pipeline or vacuum vaporization; and discharge the gas drawn into the pipeline for preventing negative pressure when the pipeline pressure is higher than atmospheric pressure; (3) discharge the gas released during the normal operation of the pipeline to avoid air traps, so as not to increase the water flow resistance, affect the water delivery efficiency, and increase the operating cost. During intake under negative pressure, the air is required to enter the pipeline quickly to reduce the negative pressure; and during exhausting under positive pressure, the gas is required to discharge from the pipeline relatively slowly. If the intake is slow, then the negative pressure may not be effectively suppressed; and if the exhausting is fast, then the subsequent bridging water hammer may cause large pressure fluctuations, thereby damaging the pipelines, air valves or other electromechanical equipment. Therefore, an ideal air valve must be able to take in air quickly and discharge air slowly.

Regarding the air valve, there are the following two ways to achieve fast intake and slow exhausting: (1) Through reasonable flow path design, the intake and exhausting processes have different flow coefficients, i.e., $C_{in} > C_{out}$. Liu Meiqing et al. (2004) pointed out in their research that only when $C_{in}/C_{out} > 10$, the air valve produces a relatively significant effect of water hammer prevention. Carlosetal. (2011), Guo Yongxin et al. (2018) also suggested in their research that a relatively small air outlet flow coefficient $C_{out}$ is beneficial for preventing water column separation and re-bridging. However, it is difficult to achieve a difference of more than ten times between the air inlet flow coefficient and the air outlet flow coefficient through flow path design. (2) The air valve is designed to have different flow path areas in the intake and exhaust processes. Liu Zhiyong and Liu Meiqing (2009) proposed an air valve configuration scheme under $(C_{in}A_{in})/(C_{out}A_{out}) = 101$ for typical projects. Wang Ling and Wang Fujun (2017) pointed out that the intake micro-exhaust valve with $A_{in}/A_{out} = 10$ is the most effective for preventing water column separation and re-bridging high-pressure water hammer during the water filling process of an empty pipeline. Since the intake and exhaust processes have different flow path areas, a large-orifice intake valve and a small-orifice exhaust valve can be arranged respectively, or an air valve capable of automatically switching the inlet area and the outlet area is arranged. Among them, the second method is more commonly used.

At present, the design idea of the air valve for water hammer prevention is as follows: the intake and exhausting processes share the same flow path and set one throttling ring. When the exhausting is relatively fast, the throttling ring is subjected to an airflow thrust which is greater than its own gravity or the spring force, and thus the throttling ring moves upward to partially block the flow path, thereby reducing the exhaust area. This scheme is completely feasible in theory, but the following problems may arise during its design and use: (1) The boundary conditions of computational fluid dynamics (CFD) analysis such as pressure inlet, flow rate inlet or pressure outlet are uniform, but the intake and exhausting of the air valve have strong three-dimensional characteristics. Therefore, the throttling ring is unevenly stressed, with a thrust and a friction resistance that are different from their design values. Whether the throttling ring can be closed at the designed wind speed or exhaust volume needs further investigation. (2) The airflow thrust in a limited space is affected by many factors such as the flow path structure and the opening degree of the throttling ring, and thus is difficult to determine accurately. Moreover, since the spring force is affected by various factors such as the spring wire material, the spring wire diameter, the spring middle diameter, the spring height and the number of spring turns, the constancy and consistency of the elasticity coefficient are also problems to be solved by designers and manufacturers. (3) Currently, there is no air valve that uses a large flow path for intake and a small flow path for exhausting. To achieve this goal, the common method is to use a vacuum break valve and an intake and exhausting air valve with a small orifice diameter. Such a method, however, not only has high equipment and installation costs, but also causes certain difficulties in land acquisition, operation and maintenance, which poses a problem that needs to be solved.

SUMMARY

In order to overcome the problems of the prior art, the present disclosure proposes a variable-flow-path air valve for water hammer prevention and a design method. The air valve for water hammer prevention is provided with two air paths, including a first path for both intake and exhausting, and a second path only for intake. Without any power and control, the present disclosure realizes the ventilation function with the intake volume greater than the exhaust volume.

The objective of the present disclosure is achieved as follows. A variable-flow-path air valve for water hammer prevention includes a valve body with a bottom provided with a connecting member configured to be connected to a water pipeline. The valve body is in the shape of a hollow pot with an upper necked part, a lower necked part and a middle convex part. The upper necked part is a revolving body. The cross-sectional shape of the middle convex part of the valve body is a regular polygon. The bottom of the valve body is provided with a fluid inlet-outlet port, and the top of the valve body is provided with an air intake-exhaust port. The air intake-exhaust port is provided with a sealing ring. A ball valve seat and a floating ball are arranged below the air intake-exhaust port. The ball valve seat includes a grid, a guide sleeve and a floating ball base with a plurality of flow holes from top to bottom. The ball valve seat and the valve body are fixedly connected by a guide sleeve holder. The lower half of the middle convex part is provided with at least one swing check valve configured to be opened inward. The swing check valve includes: a swing valve disc connected to a valve body hinge, a variable-flow-path air inlet controlled by the swing valve disc to open and close, a device for limiting the opening degree of the swing valve disc, and a sealing device.

Further, the device for limiting the opening degree of the valve disc is a limit ring, and the limit ring is fixedly connected to the valve body through a limit ring holder.

Further, the opening and closing angle of the swing valve disc of the swing check valve is 30° to 45°.

Further, the cross-sectional shape of the middle convex part of the valve body is a regular octagon, and four swing check valves are evenly distributed around the valve body.

Further, the cross-sectional shape of the middle convex part of the valve body is a regular dodecagon, and six swing check valves are evenly distributed around the valve body.

Further, a valve cover is provided above the air intake-exhaust port.

Further, the guide sleeve holder is a plurality of sheet-shaped members surrounding the guide sleeve.

Further, the floating ball is a hollow ball made of a non-metallic material.

A method of using the variable-flow-path air valve for water hammer prevention includes the following steps:

normal water delivery state:

step 1: closing the air valve, wherein the water pipeline is operating normally for water delivery with no tendency to water hammer, the valve body is full of water, the water lifts the floating ball to the sealing ring at the air intake-exhaust port on the upper part of the valve body, and the floating ball and the sealing ring jointly seal the air intake-exhaust port to prevent air and water from entering or exiting;

step 2: releasing air, wherein during normal water delivery of the water pipeline, a small amount of air is released from the water in the pipeline, the released air gradually gathers into the valve body and finally into the top of the air valve; as the volume of the air increases, the water level drops to reduce the buoyancy acting on the floating ball and separate the floating ball from the sealing ring, and the air is quickly discharged from the air intake-exhaust port; after the released air is discharged, the water level rises to lift the floating ball to the sealing ring, the air valve is closed, and the water pipeline continues to maintain the normal water delivery state;

water hammer prevention state:

step 3: performing air valve drainage, wherein when negative pressure occurs in the water pipeline, the water in the valve body is attracted by the water pipeline from the fluid inlet-outlet port to the water pipeline; as the water level in the valve body drops, the floating ball drops accordingly, the air intake-exhaust port is opened, and the air enters the valve body to fill the space vacated by the water flowing away;

step 4: performing variable-flow-path intake, wherein when the water level in the valve body drops below the swing check valve, the swing check valve is opened under the action of atmospheric pressure, and the air enters the valve body simultaneously through the air intake-exhaust port and the variable-flow-path air inlet, and then enters the water pipeline through the valve body;

step 5: performing air valve exhausting, wherein when the pressure in the water pipeline recovers to be greater than the atmospheric pressure, the air pressure in the valve body increases accordingly, and the swing valve disc of the swing check valve closes the variable-flow-path air inlet under the action of gravity, to allow the air to be discharged from the valve body only through the air intake-exhaust port; and step 6: performing air valve intake, wherein as the pressure in the water pipeline gradually recovers, the air in the pipeline enters the valve body and is discharged through the air intake-exhaust port; as the air is discharged, the water in the water pipeline enters the valve body; as the water level in the valve body gradually rises, the floating ball rises due to the buoyancy of the water; until the floating ball rises to contact the sealing ring, the air valve is completely closed, and the water pipeline returns to the normal water delivery state.

A design method of the air valve includes the following steps:

step 01: determination of the inlet area and the outlet area of the air valve: determining the inlet flow path area $A_{in}$ and the outlet flow path area $A_{out}$ of the air valve through an analysis of a hydraulic transient process, wherein when air flows through the air valve, boundary conditions of the analysis include the following four situations:

1) when the air flows in at subsonic speed:

$$\dot{M}_a = C_{in}A_{in}\sqrt{7p_a\rho_a\left[\left(\frac{p}{p_a}\right)^{1.4286} - \left(\frac{p}{p_a}\right)^{1.714}\right]}, 0.53p_a < p < p_a;$$

wherein $\dot{M}_a$ is the air mass flow rate, in kg/s; $C_{in}$ is the air inlet flow coefficient; $A_{in}$ is the inlet area, in m$^2$; $p_a$ is the atmospheric pressure, in Pa; $\rho_a$ is the atmospheric density, in kg/m$^3$; p is the pipeline pressure at the corresponding position of the air valve, in Pa;

2) when the air flows in at a critical speed:

$$\dot{M}_a = C_{in}A_{in}\frac{0.686}{\sqrt{RT_0}}p_a, p \le 0.53p_a;$$

wherein R is the gas constant, 8.31·J·mol$^{-1}$K$^{-1}$; T$_0$ is the absolute temperature of a gas, in K;

3) when the air flows out at subsonic speed:

$$\dot{M}_a = -C_{out}A_{out}p\sqrt{\frac{7}{RT}\left[\left(\frac{p_a}{p}\right)^{1.4286} - \left(\frac{p}{p_a}\right)^{1.714}\right]}, \; p_a < p < \frac{p_a}{0.53};$$

wherein $C_{out}$ is the air outlet flow coefficient; $A_{out}$ is the outlet area, in m$^2$;

4) when the air flows out at a critical speed:

$$\dot{M}_a = -C_{out}A_{out}\frac{0.686p}{\sqrt{RT}}, \; \frac{p_a}{0.53} < p;$$

step 02: calculation of the diameter of the air intake-exhaust port: according to the required outlet flow path area $A_{out}$, calculating the diameter $d_1$ of the air intake-exhaust port:

$$d_1 = \sqrt{\frac{4A_{out}}{\pi}};$$

step 03: determination of the total area of the variable flow path: calculating the area $A_{variable\;flow\;path}$ of the variable flow path as:

$$A_{variable\;flow\;path} = A_{in} - A_{out};$$

step 04: determination of the area of each single flow path: designing the cross-sectional shape of the middle convex part of the valve body as a regular polygon, and setting the number of faces of the prismatic valve body as N, wherein N is an even number greater than or equal to 6, namely 6, 8, 12 . . . ;

according to the cross-sectional shape of the middle convex part of the valve body, calculating the flow area $A_{single\;flow\;path}$ of the variable flow path on each face of the prismatic valve body as:

$$A_{single\;flow\;path} = \frac{A_{in} - A_{out}}{\frac{N}{2}};$$

step 05, determination of the opening size of the variable flow path: designing the cross-sectional shape of the prismatic valve body as a regular polygon, setting the diameter of the inscribed circle of the regular polygon as an integer multiple of the diameter of the air valve, and then calculating the area of a single flow path as:

$$A_{single\;flow\;path} = \frac{A_{in} - A_{out}}{\frac{N}{2}} = sL;$$

wherein s is the opening size of the swing check valve, in m; L is the width of the variable-flow-path air inlet, in m.

The advantages of the present disclosure are as follows. In the present disclosure, two flow paths are arranged, including the air intake-exhaust port as a flow path controlled by the floating ball, and the variable flow path controlled by the swing check valve. As a flow path, the air intake-exhaust port is opened for circulation when the water level in the valve body drops, and is closed only when the air in the air valve is nearly discharged completely and the water level rises to lift the floating ball. The variable flow path can be opened only when the water pipeline is under negative pressure and the water in the valve body is nearly discharged completely. When the pressure in the air valve is greater than atmospheric pressure, the swing check valve is closed due to gravity. The air valve takes in air through the air intake-exhaust port and the variable flow path, and discharges air only through the air intake-exhaust port. In this way, the flow path is changed to change the inlet flow path area and the outlet flow path area, thereby realizing fast intake and slow exhausting. The opening force of the variable flow path is negative pressure, while the closing force of the variable flow path is the gravity of the swing valve disc. The force of adjusting the outlet area is adjusted from airflow thrust to gravity, which not only avoids the force acting on the throttling ring and the uncertainty of the closure process caused by the strong three-dimensional characteristics during the exhaust process, but also solves the instability of the spring force. The air valve can be set to any inlet area and outlet area according to numerical simulation results. The area of the variable flow path is controlled by a prismatic valve body, a swing check valve that is opened inward, and a limit ring. If the area of the variable flow path is large, then the number of faces and size of the valve body as well as the opening degree of the swing check valve can be increased, and vice versa.

BRIEF DESCRIPTION OF THE DRAWINGS

The present disclosure will be further described below in conjunction with the drawings and embodiments.

DETAILED DESCRIPTION OF THE EMBODIMENTS

Embodiment 1

Figure 1:
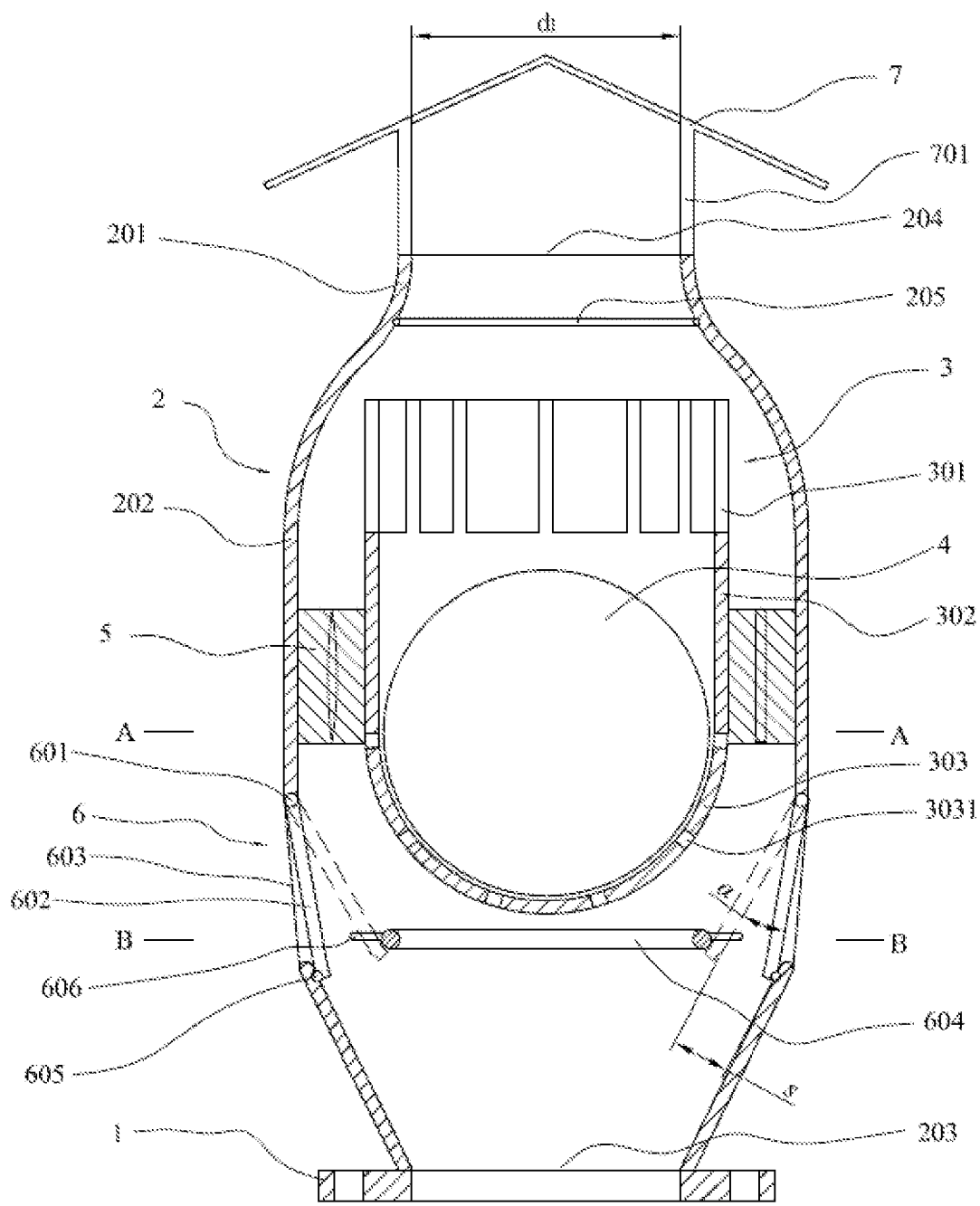
FIG. 1 is a schematic view of the structure of the air valve according to Embodiments 1, 2, 3, 6 and 7 of the present disclosure.
Figure 2:
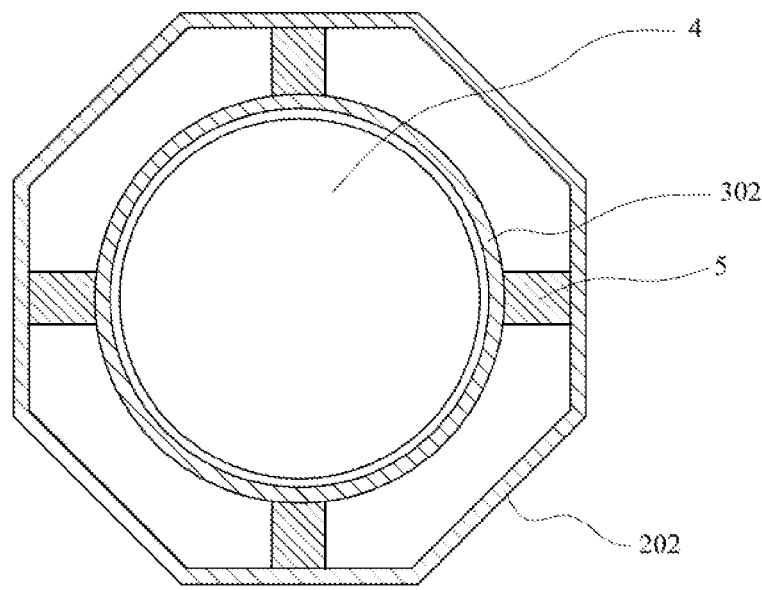
FIG. 2 is a schematic cross-sectional view of the upper half of the middle part of the valve body of the air valve according to Embodiments 1 and 4 of the present disclosure, taken along line A-A in FIG. 1.

This embodiment is a variable-flow-path air valve for water hammer prevention, as shown in FIG. 1. The variable-flow-path air valve includes the valve body 2 with a bottom provided with a connecting member 1 configured to be connected to a water pipeline. The valve body is in the shape of a hollow pot with an upper necked part, a lower necked part and a middle convex part. The upper necked part 201 is a revolving body. The cross-sectional shape of the middle convex part 202 of the valve body is a regular polygon, as shown in FIG. 2 (FIG. 2 shows a regular octahedron, that is, a valve body with a cross-sectional shape of a regular octagon). The bottom of the valve body is provided with the fluid inlet-outlet port 203, and the top of the valve body is provided with the air intake-exhaust port 204. The air intake-exhaust port is provided with the sealing ring 205. The ball valve seat 3 and the floating ball 4 are arranged below the air intake-exhaust port. The ball valve seat includes the grid 301, the guide sleeve 302 and the floating ball base 303 with a plurality of flow holes 3031 from top to bottom. The ball valve seat and the valve body are fixedly connected by the guide sleeve holder 5. The lower half of the middle convex part is provided with at least one swing check valve 6 configured to be opened inward. The swing check valve includes: the swing valve disc 602 connected to the valve body hinge 601, the variable-flow-path air inlet 603 controlled by the swing valve disc to open and close, the device 604 for limiting the opening degree of the valve disc, and the sealing device 605.

The basic principle of this embodiment is to use the swing check valve on the side wall of the valve body to additionally open an intake path during intake, thereby realizing the ventilation function with the intake volume greater than the exhaust volume.

The swing check valve is a valve disc that is hinged on the valve body, and only relies on gravity, air pressure and water pressure to be opened and closed, without any manpower and the reset of the spring. The entire mechanism involves a simple structure with fewer parts, which greatly reduces the probability of failure and the cost of maintenance.

The swing valve disc of the swing check valve is rectangular. The upper end of the swing valve disc is provided with a hinge, and a sealing device is provided on the edge of the swing valve disc. A device for limiting the opening degree of the valve disc is arranged at an appropriate position to limit the opening and closing of the swing valve disc. The sealing device can be rubber strips or other materials that can produce a sealing effect. The device for limiting the opening degree of the valve disc can be a retaining ring or a limiting stopper arranged on the hinge.

The valve body is installed vertically on the water pipeline, and the connecting member can be a flange or other welded or bolted parts. The middle convex part of the valve body is designed as a polyhedron to facilitate the installation of the disc of the swing check valve. The valve body is a polyhedral columnar structure with a cross-sectional shape of a regular polygon, and the number of faces of the polyhedral columnar structure is an even number, which can be a regular octahedron or a regular dodecahedron. Swing check valves are arranged at certain intervals in the lower half and on the faces of the valve body around its center. When negative pressure occurs in the pipeline, the swing check valve is opened toward the inside of the valve body, as shown by the dotted lines in FIG. 1. When the negative pressure of the pipeline is small or the pressure of the pipeline is greater than atmospheric pressure, the check valve is closed under the action of gravity.

A guide sleeve is arranged in the center of the valve body, and the guide sleeve is fixedly connected to the valve body through a guide sleeve holder surrounding the guide sleeve. The guide sleeve is a cylinder serving as a movement track of the floating ball. From top to bottom, there are a grid serving as a water-gas path, a cylinder, and a floating ball base. The floating ball base is a spherical base provided with flow holes to allow the water flow to pass through when the exhausting is completed and the water level rises to the floating ball base, so that the floating ball floats.

The floating ball is a hollow body made of rubber, nylon, or other non-metallic materials, and can float in water.

In order to prevent foreign objects such as branches, leaves, and stones from entering the air valve, a valve cover can be installed on the top of the valve body, that is, above the air intake-exhaust port. The valve cover can be conical or in other shape, and is connected to the valve body through a valve cover holder.

Embodiment 2

Figure 3:
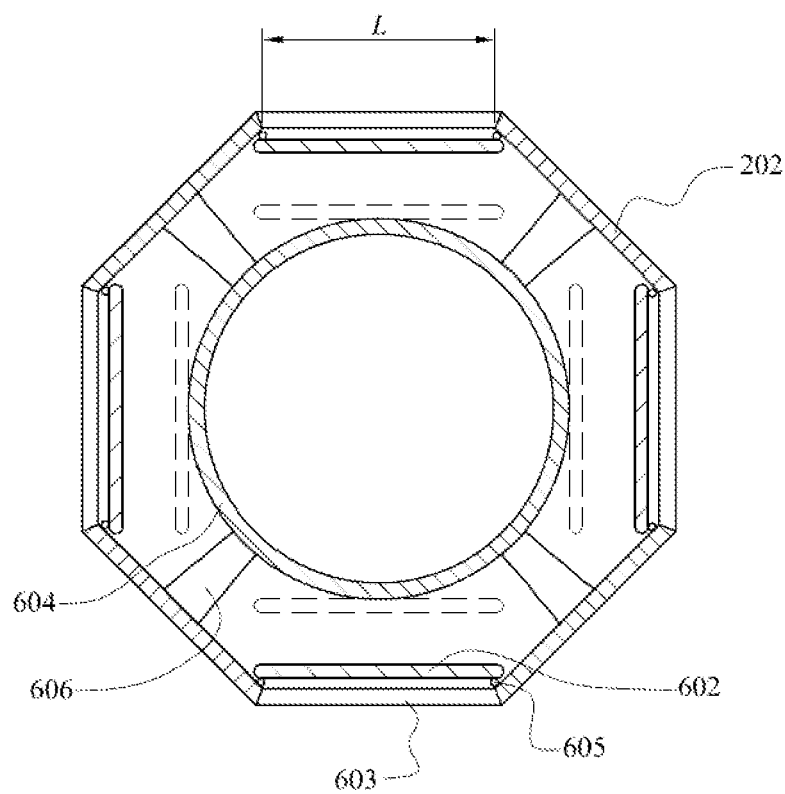
FIG. 3 is a schematic cross-sectional view of the lower half of the middle part of the octahedral valve body of the air valve according to Embodiments 1, 3, 4 and 5 of the present disclosure, taken along line B-B in FIG. 1.

This embodiment is an improvement of Embodiment 1, and specifically is a refinement of the device for limiting the opening degree of the valve disc in Embodiment 1. The device for limiting the opening degree of the valve disc in this embodiment is a limit ring, and the limit ring is fixedly connected to the valve body through a limit ring holder. As shown in FIGS. 1 and 3, the dotted lines represent the position of the swing valve disc when opened.

In this embodiment, the limit ring is arranged at a certain position to allow its edge to block the swing valve disc from continuing to open. The limit ring can be circular or a regular polygon matched with the valve body, for example, the valve body is a regular octahedron, and the limit ring is a regular octagon.

Embodiment 3

This embodiment is an improvement of the above-mentioned embodiments, and specifically is a refinement of the above-mentioned embodiments regarding the opening and closing angle of the swing valve disc. In this embodiment, the opening and closing angle α of the swing valve disc of the swing check valve is 30° to 45°, as shown in FIG. 1.

The opening and closing angle should not be too large. If the angle is too large, the swing check valve may be unable to be closed due to the impact of the water flow. If the angle is too small, it is not conducive to the flow of air. Thus, the angle α should be determined according to the air flow rate.

Embodiment 4

This embodiment is an improvement of the above-mentioned embodiments, and specifically is a refinement of the cross-sectional shape of the middle part of the valve body of the above-mentioned embodiments. In this embodiment, the cross-sectional shape of the middle convex part of the valve body is a regular octagon, as shown in FIG. 2, and four swing check valves are evenly distributed around the valve body, as shown in FIG. 3.

The regular polyhedron is a relatively simple shape that is easy to manufacture. The larger the width of each face, the easier it is to arrange the variable-flow-path air inlet with a larger width L, as shown in FIG. 3.

Embodiment 5

Figure 4:
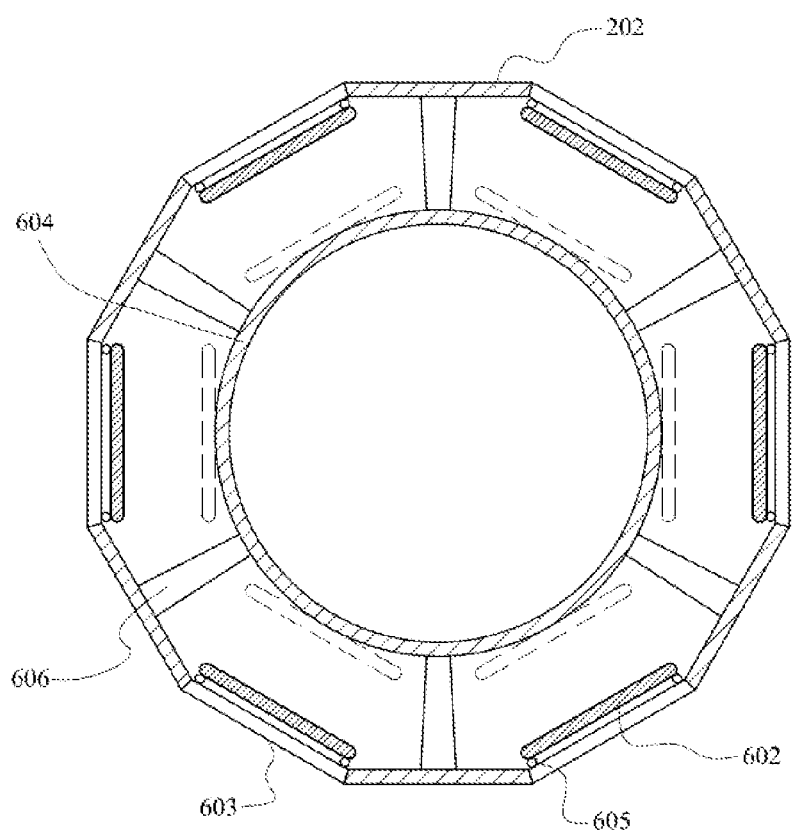
FIG. 4 is a schematic cross-sectional view of the lower half of the middle part of the dodecahedral valve body of the air valve according to Embodiments 5 and 10 of the present disclosure, taken along line B-B in FIG. 1.

This embodiment is an improvement of the above-mentioned embodiments, and specifically is a refinement of the middle convex part of the valve body of the above-mentioned embodiments. In this embodiment, the cross-sectional shape of the middle convex part of the valve body is a regular dodecagon, and six swing check valves are evenly distributed around the valve body, as shown in FIG. 4.

When the number of faces of the regular polyhedron is increased, more variable-flow-path air inlets can be arranged.

Embodiment 6

This embodiment is an improvement of the above-mentioned embodiments, and specifically is a refinement of the valve body of the above-mentioned embodiments. In this embodiment, the valve cover is provided above the air intake-exhaust port of the valve body, as shown in FIG. 1.

The valve cover is mainly configured to block foreign objects from entering the valve body. The valve cover can be flat, conical or the like. The valve cover can be connected to the valve body through the valve cover holder 701, as shown in FIG. 1.

The valve cover holder is a cylindrical holder that is connected to the valve body and supports the valve cover. The upper side of the valve cover holder is connected to the valve cover, and the lower side of the valve cover holder is welded to the valve body. The valve cover holders are evenly arranged along the circumference of the valve body, and the number of the valve cover holders is generally selected as 3 to 8, as long as the structural strength can be ensured. A steel mesh can be enclosed on the holder as a filter to prevent foreign objects from being drawn into the valve body.

Embodiment 7

This embodiment is an improvement of the above-mentioned embodiments, and specifically is a refinement of the guide sleeve holder of the above-mentioned embodiments. In this embodiment, the guide sleeve holder is a plurality of sheet-shaped members surrounding the guide sleeve.

The cross-sectional shape of the sheet-shaped members along the water flow direction can be a rectangle with rounded corners at both ends, as shown in the cross-sectional shape of the guide sleeve holder on the right side in FIG. 1, or can also be an ellipse with sharp corners at both ends, as shown in the cross-sectional shape of the guide sleeve holder on the left side in FIG. 1.

Embodiment 8

This embodiment is an improvement of the above-mentioned embodiments, and specifically is a refinement of the floating ball of the above-mentioned embodiments. In this embodiment, the floating ball is a hollow ball of a non-metallic material.

The hollow floating ball is easier to float, has a certain weight, and has a large surface hardness, and thus can effectively seal the air intake-exhaust port.

Embodiment 9

Figure 5:
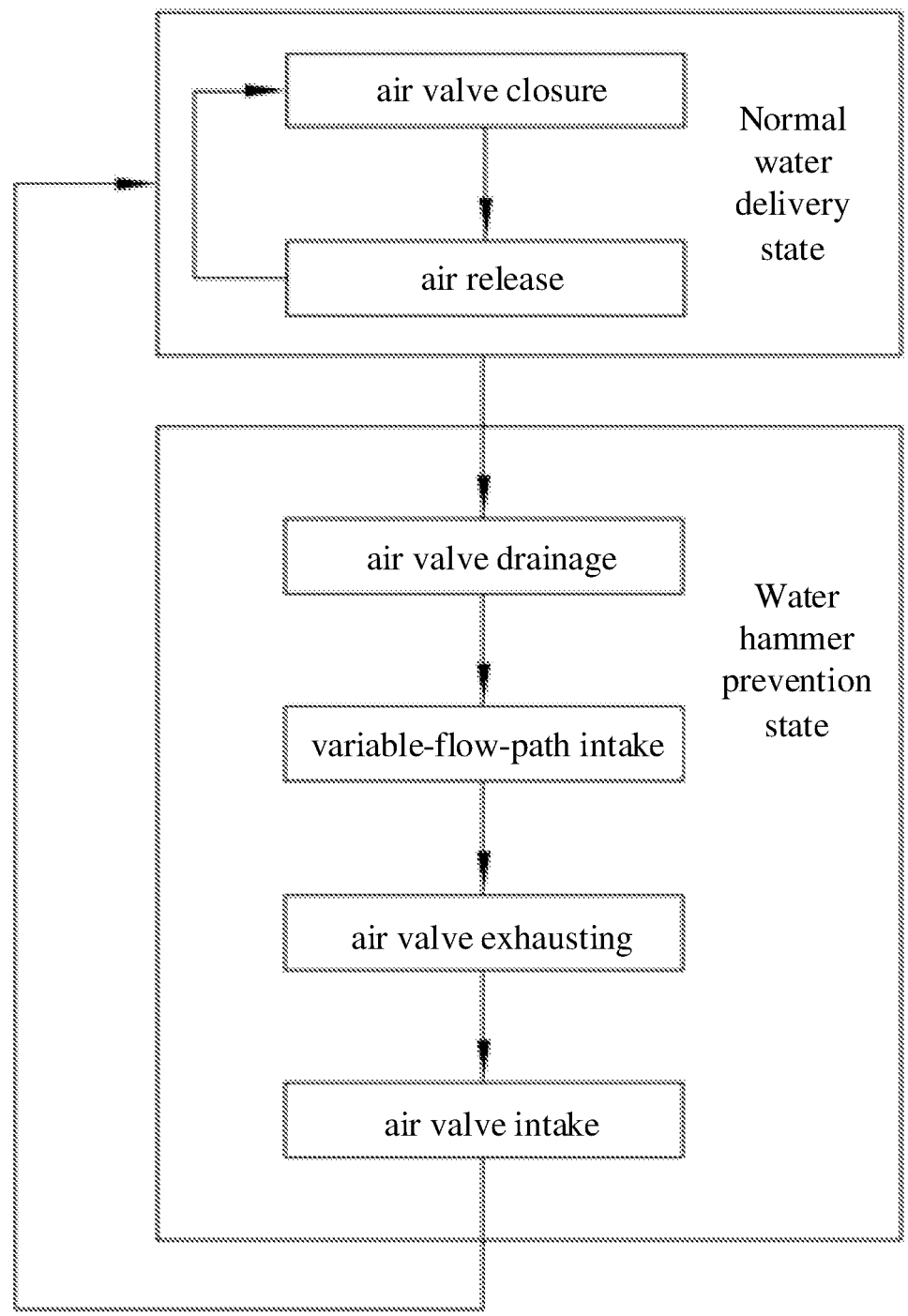
FIG. 5 is a flowchart of the method for water hammer prevention according to Embodiment 9 of the present disclosure.

This embodiment is a method of using the variable-flow-path air valve for water hammer prevention. The method for water hammer prevention includes the following steps:

The method mainly has two states, including a state of the air valve in which the water pipeline conveys water normally, and a state of water hammer prevention in which a pressure drop occurs in the water pipeline. The flowchart of the method for water hammer prevention is shown in FIG. 5.

Figure 6:
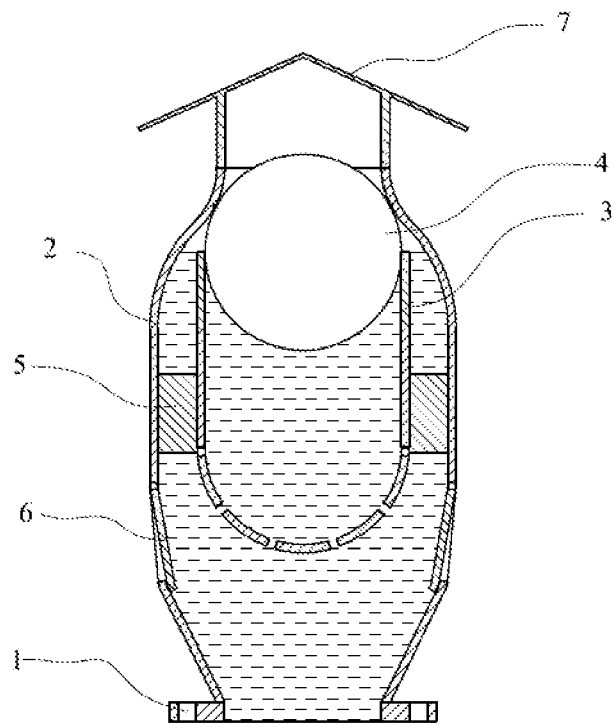
FIG. 6 is a schematic view of the closed state of the air valve when the water pipeline conveys water normally according to Embodiment 9 of the present disclosure.

Normal Water Delivery State:

Step 1: air valve closure: the water pipeline is operating normally for water delivery with no tendency to water hammer, the valve body is full of water, the water lifts the floating ball to the sealing ring at the air intake-exhaust port on the upper part of the valve body, and the floating ball and the sealing ring jointly seal the air intake-exhaust port to prevent air and water from entering or exiting, as shown in FIG. 6.

This step involves a normal state representing normal water delivery in the pipeline, in which the water pressure, the flow rate and flow velocity in the pipeline are normal, and the floating ball in the air valve abuts on the sealing ring of the air intake-exhaust port to close the air intake-exhaust port.

Figure 7:
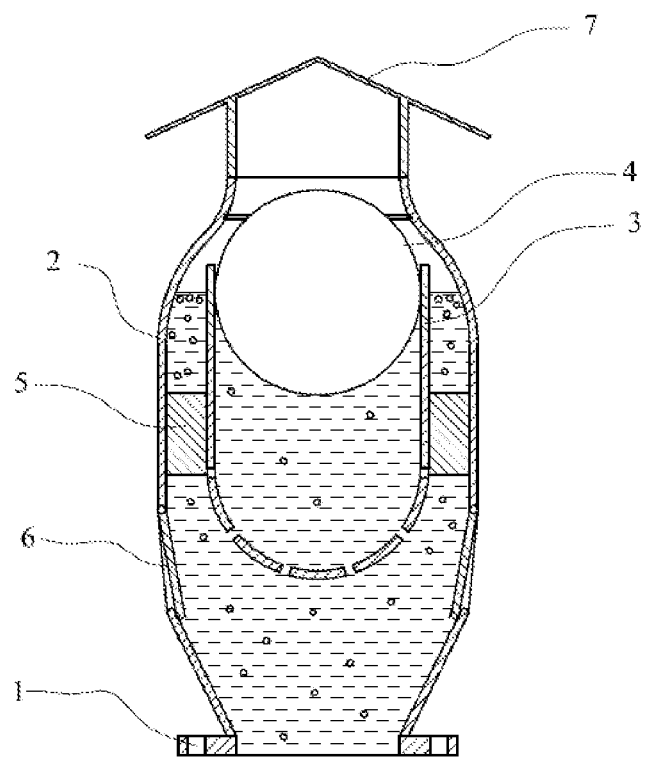
FIG. 7 is a schematic view of the opened state of the air valve when air is released from the water pipeline according to Embodiment 9 of the present disclosure.

Step 2: air release: during normal water delivery of the water pipeline, a small amount of air is released from the water in the pipeline, the released air gradually gathers into the valve body and finally into the top of the air valve; as the volume of the air increases, the water level drops to reduce the buoyancy acting on the floating ball and separate the floating ball from the sealing ring, and the air is quickly discharged from the air intake-exhaust port; after the released air is discharged, the water level rises to lift the floating ball to the sealing ring, the air valve is closed, and the water pipeline continues to maintain the normal water delivery state, as shown in FIG. 7.

During water delivery, air is continuously released from the water in the water pipeline. The released air moves with the water flow until there is a place that allows the released air to rise and gather naturally, and the air valve is indeed a place for the air released from the water to gather. When the released air gathers to a certain extent, the floating ball of the air valve drops to release the gathered air.

Figure 8:
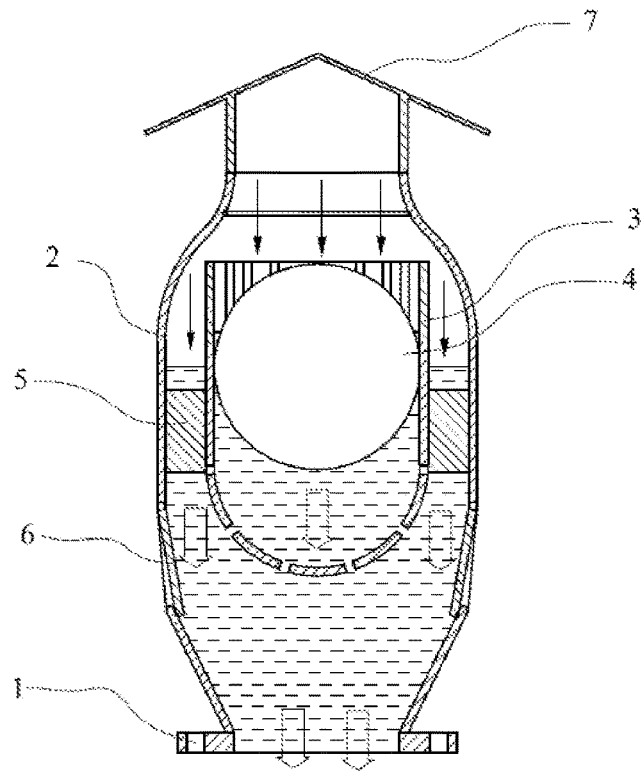
FIG. 8 is a schematic view of a state in which a pressure drop in the water pipeline causes the air valve to open according to Embodiment 9 of the present disclosure.

Water hammer prevention state: Step 3: air valve drainage: when negative pressure occurs in the water pipeline, the water in the valve body is attracted by the water pipeline from the fluid inlet-outlet port to the water pipeline; as the water level in the valve body drops, the floating ball drops accordingly, the air intake-exhaust port is opened, and the air enters the valve body to fill the space vacated by the water flowing away, as shown in FIG. 8.

Figure 9:
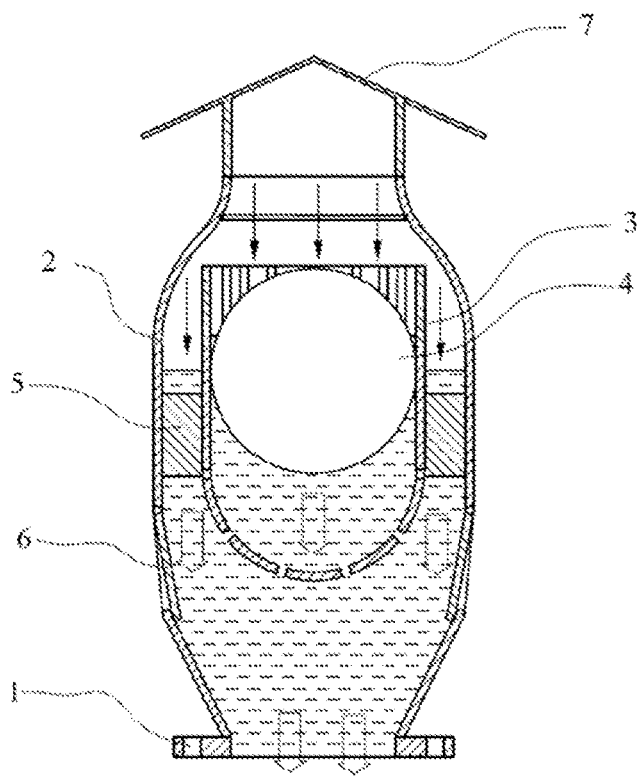
FIG. 9 is a schematic view of a state in which a pressure drop in the water pipeline causes the air valve and the swing check valve to open according to the Embodiment 9 of the present disclosure.
Figure 10:
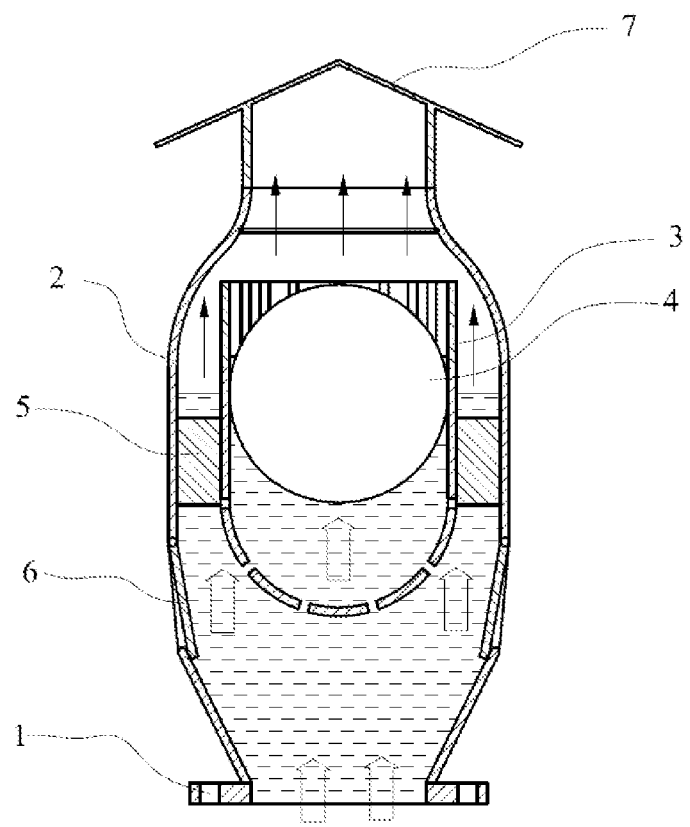
FIG. 10 is a schematic view of a state after the swing check valve is closed when the pressure of the water pipeline recovers according to Embodiment 9 of the present disclosure.

When a pressure drop as an early water hammer phenomenon occurs in the water pipeline, the water in the valve body is first replenished into the water pipeline. At this time, the floating ball opens the air intake-exhaust port of the control valve, so that the air fills the space vacated by the water flowing away. If the water pressure in the water pipeline rises rather than continues to drop, the water in the water pipeline returns to the valve body, so that the control valve returns to the closed state. But if instead, the water pressure in the water pipeline continues to drop, it is necessary to proceed to the next step to fill the space vacated by the water flowing away. In FIGS. 8, 9 and 10, the single-line arrows indicate the flow paths of air, while the hollow arrows indicate the flow paths of water flows.

Step 4: variable-flow-path intake: when the water level in the valve body drops below the swing check valve, the swing check valve is opened under the action of atmospheric pressure, and the air enters the valve body simultaneously through the air intake-exhaust port and the variable-flow-path air inlet, and then enters the water pipeline through the valve body, to achieve fast intake of a large amount of air and reduce the negative water hammer pressure, thereby preventing the pipeline from being collapsed, as shown in FIG. 9.

The swing check valve is opened to increase the amount of air entering the water pipeline, so that the air flows into the water pipeline through two paths to speed up filling the space vacated due to the pressure drop, thereby reducing the water hammer pressure.

Step 5: air valve exhausting: when the pressure in the water pipeline recovers to be greater than the atmospheric pressure, the air pressure in the valve body increases accordingly, and the swing valve disc of the swing check valve closes the variable-flow-path air inlet under the action of gravity, to allow the air to be discharged from the valve body only through the air intake-exhaust port; since the exhaust area is greatly reduced, the exhaust velocity is also greatly reduced, thereby reducing the water hammer strength caused by water column bridging, as shown in FIG. 10.

The swing check valve is closed to provide only one path for the air to flow out, thereby slowing down the speed of air discharge, slowing down the increase speed of pressure, and further avoiding the occurrence of water hammer.

Step 6: air valve intake: as the pressure in the water pipeline gradually recovers, the air in the pipeline enters the valve body and is discharged through the air intake-exhaust port; as the air is discharged, the water in the water pipeline enters the valve body; as the water level in the valve body gradually rises, the floating ball rises due to the buoyancy of the water; until the floating ball rises to contact the sealing ring, the air valve is completely closed, and the water pipeline returns to the normal water delivery state, as shown in FIG. 6.

Embodiment 10

This embodiment is a design method of the variable-flow-path air valve. The basic idea of this embodiment is to find the difference between the air entering and leaving the valve body, and then calculate the air flow when the swing check valve is opened according to the difference, thereby determining the size of the variable-flow-path air inlet of the swing check valve and the opening degree of the swing valve disc.

The design method specifically includes the following steps:

step 01: determination of the inlet area and the outlet area of the air valve: the inlet flow path area $A_{in}$ and the outlet flow path area $A_{out}$ of the air valve are determined through an analysis of a hydraulic transient process, wherein when air flows through the air valve, boundary conditions of the analysis include the following four situations:

1) when the air flows in at subsonic speed:

$$\dot{M}_a = C_{in}A_{in}\sqrt{7p_a\rho_a\left[\left(\frac{p}{p_a}\right)^{1.4286} - \left(\frac{p}{p_a}\right)^{1.714}\right]}, 0.53p_a < p < p_a;$$

wherein $\dot{M}_a$ is the air mass flow rate, in kg/s; $C_{in}$ is the air inlet flow coefficient; $A_{in}$ is the inlet area, in m²; $p_a$ is the atmospheric pressure, in Pa; $\rho_a$ is the atmospheric density, in kg/m³; p is the pipeline pressure at the corresponding position of the air valve, in Pa;

2) when the air flows in at a critical speed:

$$\dot{M}_a = C_{in}A_{in}\frac{0.686}{\sqrt{RT_0}}p_a, p \leq 0.53p_a;$$

wherein R is the gas constant, 8.31·J·mol⁻¹K⁻¹; $T_0$ is the absolute temperature of a gas, in K;

3) when the air flows out at subsonic speed:

$$\dot{M}_a = -C_{out}A_{out}p\sqrt{\frac{7}{RT}\left[\left(\frac{p_a}{p}\right)^{1.4286} - \left(\frac{p_a}{p}\right)^{1.714}\right]}, p_a < p < \frac{p_a}{0.53};$$

wherein $C_{out}$ is the air outlet flow coefficient; $A_{out}$ is the outlet area, in m²;

4) when the air flows out at a critical speed:

$$\dot{M}_a = -C_{out}A_{out}\frac{0.686p}{\sqrt{RT}}, \frac{p_a}{0.53} < p;$$

step 02: calculation of the diameter of the air intake-exhaust port: according to the required outlet flow path area $A_{out}$, the diameter $d_1$ of the air intake-exhaust port is calculated as:

$$d_1 = \sqrt{\frac{4A_{out}}{\pi}};$$

step 03: determination of the total area of the variable flow path: the area $A_{variable\ flow\ path}$ of the variable flow path is calculated as:

$$A_{variable\ flow\ path} = A_{in} - A_{out};$$

step 04: determination of the area of each single flow path: the cross-sectional shape of the middle convex part of the valve body is designed as a regular polygon, and the number of faces of the prismatic valve body is set as N, wherein N is an even number greater than or equal to 6, namely 6, 8, 12 . . . ;

according to the cross-sectional shape of the middle convex part of the valve body, the flow area $A_{single\ flow\ path}$ of the variable flow path on each face of the prismatic valve body is calculated as:

$$A_{single\ flow\ path} = \frac{A_{in} - A_{out}}{\frac{N}{2}};$$

step 05, determination of the opening size of the variable flow path: the cross-sectional shape of the prismatic valve body is designed as a regular polygon, the diameter of the inscribed circle of the regular polygon is set as an integer multiple of the diameter of the air valve, and then the area of a single flow path is calculated as:

$$A_{single\ flow\ path} = \frac{A_{in} - A_{out}}{\frac{N}{2}} = sL;$$

wherein s is the opening size of the swing check valve, in m; L is the width of the variable-flow-path air inlet, in m.

Figure 11:
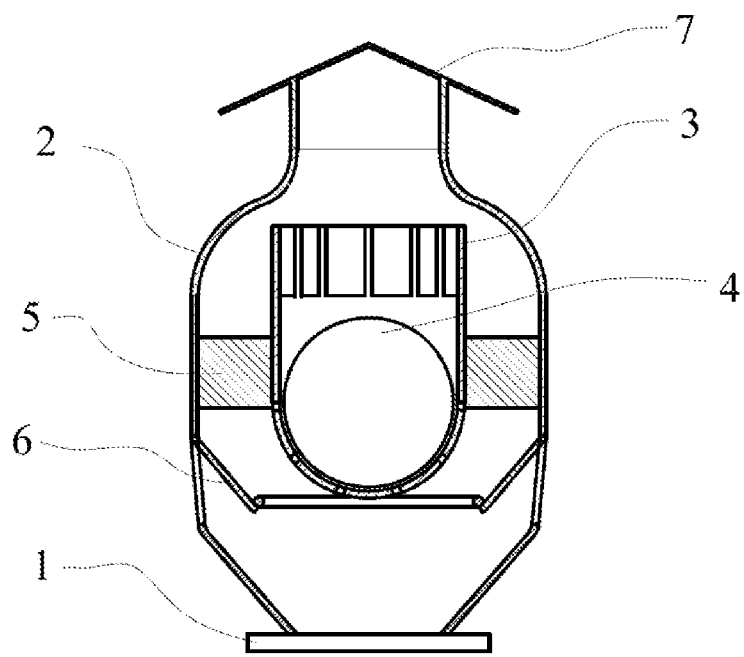
FIG. 11 is a schematic view of the flow area of the variable flow path increased by increasing the number of faces of the prismatic valve body using the calculation method according to Embodiment 10 of the present disclosure.

The parameters N, s and L generally need to be determined after several trial calculations, and the flow area of the variable flow path can be increased by increasing the number of faces of the prismatic valve body, increasing the diameter of the inscribed circle of the prismatic valve body, and other means. FIGS. 4 and 11 illustrate the flow area of the variable flow path increased by increasing the diameter of the inscribed circle of the prismatic valve body and increasing the number of faces of the prismatic valve body.

Finally, it should be noted that the above is only used to illustrate rather than to limit the technical solution of the present disclosure. Although the present disclosure has been described in detail with reference to preferred arrangements, those skilled in the art should understand, the technical solution of the present disclosure (such as the basic form of the air valve, the application of various formulas, and the sequence of steps) can be modified or equivalently replaced without departing from the spirit and scope of the technical solution of the present disclosure.

What is claimed is:

1. A variable-flow-path air valve for water hammer prevention, comprising:
a valve body with a bottom provided with a connecting member configured to be connected to a water pipeline; wherein the valve body is in the shape of a hollow pot with an upper necked part, a lower necked part and a middle convex part; the upper necked part is a revolving body; a cross-sectional shape of the middle convex part of the valve body is a regular polygon; the bottom of the valve body is provided with a fluid inlet-outlet port, and a top of the valve body is provided with an air intake-exhaust port; the air intake-exhaust port is provided with a sealing ring; a ball valve seat and a floating ball are arranged below the air intake-exhaust port; the ball valve seat comprises a grid, a guide sleeve and a floating ball base with a plurality of flow holes from top to bottom; the ball valve seat and the valve body are fixedly connected by a guide sleeve holder; the lower half of the middle convex part is provided with at least one swing check valve configured to be opened inward; the at least one swing check valve comprises: a swing valve disc connected to a valve body hinge, a variable-flow-path air inlet controlled by the swing valve disc to open and close, a device for limiting an opening degree of the swing valve disc, and a sealing device.

2. The variable-flow-path air valve according to claim 1, wherein the device for limiting the opening degree of the swing valve disc is a limit ring, and the limit ring is fixedly connected to the valve body through a limit ring holder.

3. The variable-flow-path air valve according to claim 2, wherein an opening and closing angle of the swing valve disc of the at least one swing check valve is 30° to 45°.

4. The variable-flow-path air valve according to claim 3, wherein the cross-sectional shape of the middle convex part of the valve body is a regular dodecagon, and six swing check valves are evenly distributed around the valve body.

5. The variable-flow-path air valve according to claim 4, wherein the valve cover is provided above the air intake-exhaust port.

6. The variable-flow-path air valve according to claim 3, wherein the cross-sectional shape of the middle convex part of the valve body is a regular octagon, and four swing check valves are evenly distributed around the valve body.

7. The variable-flow-path air valve according to claim 6, wherein a valve cover is provided above the air intake-exhaust port.

8. The variable-flow-path air valve according to claim 7, wherein the guide sleeve holder is a plurality of sheet-shaped members surrounding the guide sleeve.

9. The variable-flow-path air valve according to claim 7, wherein the floating ball is a hollow ball made of a non-metallic material.

10. A method of using the variable-flow-path air valve for water hammer prevention according to claim 1, comprising the following steps:
normal water delivery state:
step 1: closing the variable-flow-path air valve, wherein the water pipeline is operating normally for water delivery with no tendency to water hammer, the valve body is full of water, the water lifts the floating ball to the sealing ring at the air intake-exhaust port on the upper part of the valve body, and the floating ball and the sealing ring jointly seal the air intake-exhaust port to prevent air and water from entering or exiting;
step 2: releasing air, wherein during normal water delivery of the water pipeline, a small amount of air is released from the water in the water pipeline, the released air gradually gathers into the valve body and finally into the top of the variable-flow-path air valve; as the volume of the air increases, a water level drops to reduce the buoyancy acting on the floating ball and separate the floating ball from the sealing ring, and the air is quickly discharged from the air intake-exhaust port; after the released air is discharged, the water level rises to lift the floating ball to the sealing ring, the variable-flow-path air valve is closed, and the water pipeline continues to maintain the normal water delivery state;
water hammer prevention state:
step 3: performing air valve drainage, wherein when negative pressure occurs in the water pipeline, the water in the valve body is attracted by the water pipeline from the fluid inlet-outlet port to the water pipeline; as the water level in the valve body drops, the floating ball drops accordingly, the air intake-exhaust port is opened, and the air enters the valve body to fill the space vacated by the water flowing away;
step 4: performing variable-flow-path intake, wherein when the water level in the valve body drops below the at least one swing check valve, the at least one swing check valve is opened under an action of atmospheric pressure, and the air enters the valve body simultaneously through the air intake-exhaust port and the variable-flow-path air inlet, and then enters the water pipeline through the valve body;
step 5: performing air valve exhausting, wherein when a pressure in the water pipeline recovers to be greater than the atmospheric pressure, an air pressure in the valve body increases accordingly, and the swing valve disc of the at least one swing check valve closes the variable-flow-path air inlet under an action of gravity, to allow the air to be discharged from the valve body only through the air intake-exhaust port; and step 6: performing air valve intake, wherein as the pressure in the water pipeline gradually recovers, the air in the water pipeline enters the valve body and is discharged through the air intake-exhaust port; as the air is discharged, the water in the water pipeline enters the valve body; as the water level in the valve body gradually rises, the floating ball rises due to the buoyancy of the water; until the floating ball rises to contact the sealing ring, the variable-flow-path air valve is completely closed, and the water pipeline returns to the normal water delivery state.

11. A design method of the variable-flow-path air valve for water hammer prevention according to claim 1, comprising the following steps:

step 01: determination of an inlet area and an outlet area of the variable-flow-path air valve: determining an inlet flow path area $A_{in}$ and an outlet flow path area $A_{out}$ of the variable-flow-path air valve through an analysis of a hydraulic transient process, wherein when air flows through the variable-flow-path air valve, boundary conditions of the analysis comprise the following four situations:

1) When the air flows in at subsonic speed:

$$\dot{M}_a = C_{in} A_{in} \sqrt{7 p_a \rho_a \left[ \left( \frac{p}{p_a} \right)^{1.4286} - \left( \frac{p}{p_a} \right)^{1.714} \right]}, \; 0.53 p_a < p < p_a;$$

wherein $\dot{M}_a$ is an air mass flow rate, in kg/s; $C_{in}$ is an air inlet flow coefficient; $A_{in}$ is the inlet area, in m$^2$; $p_a$ is atmospheric pressure, in Pa; $\rho_a$ is an atmospheric density, in kg/m$^3$; p is a pipeline pressure at a corresponding position of the variable-flow-path air valve, in Pa;

2) When the air flows in at a critical speed:

$$\dot{M}_a = C_{in} A_{in} \frac{0.686}{\sqrt{RT_0}} p_a, \; p \le 0.53 p_a;$$

wherein R is a gas constant, 8.31·J·mol$^{-1}$·K$^{-1}$; $T_0$ is an absolute temperature of a gas, in K;

3) When the air flows out at subsonic speed:

$$\dot{M}_a = -C_{out} A_{out} p \sqrt{\frac{7}{RT} \left[ \left( \frac{p_a}{p} \right)^{1.4286} - \left( \frac{p_a}{p} \right)^{1.714} \right]}, \; p_a < p < \frac{p_a}{0.53};$$

wherein $C_{out}$ is an air outlet flow coefficient; $A_{out}$ is the outlet area, in m$^2$;

4) When the air flows out at a critical speed:

$$\dot{M}_a = -C_{out} A_{out} \frac{0.686 p}{\sqrt{RT}}, \; \frac{p_a}{0.53} < p;$$

step 02: calculation of a diameter of the air intake-exhaust port: according to the outlet area $A_{out}$, calculating the diameter $d_1$ of the air intake-exhaust port:

$$d_1 = \sqrt{\frac{4 A_{out}}{\pi}};$$

step 03: determination of an area of a variable flow path: calculating the area $A_{variable\,flow\,path}$ of the variable flow path as:

$$A_{variable\,flow\,path} = A_{in} - A_{out};$$

step 04: determination of an area of each single flow path: designing the cross-sectional shape of the middle convex part of the valve body as a regular polygon, and setting a number of faces of the valve body as N, wherein N is an even number greater than or equal to 6;

according to the cross-sectional shape of the middle convex part of the valve body, calculating the flow area $A_{single\,flow\,path}$ of the variable flow path on each face of the valve body as:

$$A_{single\,flow\,path} = \frac{A_{in} - A_{out}}{\frac{N}{2}};$$

step 05, determination of an opening size of the variable flow path: designing the cross-sectional shape of the valve body as a regular polygon, setting a diameter of an inscribed circle of the regular polygon as an integer multiple of a diameter of the variable-flow-path air valve, and then calculating the area of a single flow path as:

$$A_{single\,flow\,path} = \frac{A_{in} - A_{out}}{\frac{N}{2}} = sL;$$

wherein s is an opening size of the at least one swing check valve, in m; L is a width of the variable-flow-path air inlet, in m.

\* \* \* \* \*